(12) United States Patent
Yamashita et al.

(10) Patent No.: US 11,423,731 B2
(45) Date of Patent: Aug. 23, 2022

(54) CASH MANAGEMENT APPARATUS, CASH MANAGEMENT SYSTEM, AND CASH MANAGEMENT METHOD

(71) Applicant: Glory Ltd., Himeji (JP)

(72) Inventors: Minami Yamashita, Himeji (JP); Lina Ma, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 17/144,154

(22) Filed: Jan. 8, 2021

(65) Prior Publication Data
US 2021/0225115 A1 Jul. 22, 2021

(30) Foreign Application Priority Data

Jan. 16, 2020 (JP) .............................. JP2020-005309

(51) Int. Cl.
*G07D 11/34* (2019.01)
*G07D 11/23* (2019.01)
(Continued)

(52) U.S. Cl.
CPC ............ *G07D 11/34* (2019.01); *G07D 11/13* (2019.01); *G07D 11/23* (2019.01); *G07D 11/30* (2019.01); *G07D 11/245* (2019.01)

(58) Field of Classification Search
CPC ............. G07D 11/009; G07D 11/0096; G07D 11/125; G07D 11/23; G07D 11/245; G07D 11/30; G07D 11/32; G07D 11/34; G07D 11/50; G07D 11/00; G07D 11/0087; G07D 11/12; G07D 11/13; G07D 11/20; G07D 11/235; G07D 11/24; G07D 11/25; G07D 11/36; G07G 1/00; G07G 1/009;
(Continued)

(56) References Cited

U.S. PATENT DOCUMENTS 8,141,772 B1 3/2012 Folk et al.
2006/0253349 A1* 11/2006 Brooks, Jr. ............. G07G 1/12
705/30
(Continued)

FOREIGN PATENT DOCUMENTS

JP 5728362 B2 6/2015

OTHER PUBLICATIONS

Extended European search report dated Jun. 9, 2021, in corresponding European patent Application No. 21151302.3, 7 pages.

*Primary Examiner* — Thien M Le
*Assistant Examiner* — April A Taylor
(74) *Attorney, Agent, or Firm* — Xsensus LLP

(57) ABSTRACT

A cash management apparatus includes: a communication interface configured to acquire information of cash stored in a cash handling apparatus and information of cash kept outside the cash handling apparatus; a memory configured to store the information of the cash stored in the cash handling apparatus, and store the information of the cash kept outside the cash handling apparatus as information of cash kept in a virtual safe; and processing circuitry configured to output the information, of the cash kept in the virtual safe, which is stored in the memory, to notify a user. A plurality of pieces of information, each of which is information of cash kept in each of a plurality of virtual safes, is stored in the memory.

18 Claims, 8 Drawing Sheets

(51) Int. Cl.
*G07D 11/13* (2019.01)
*G07D 11/30* (2019.01)
*G07D 11/245* (2019.01)

(58) Field of Classification Search
CPC ............ G07G 1/12; G07G 1/14; G06Q 20/20;
G06Q 20/202
See application file for complete search history.

(56) References Cited

U.S. PATENT DOCUMENTS

| | | | |
|---|---|---|---|
| 2016/0350993 A1 | 12/2016 | Doi et al. | |
| 2018/0293649 A1* | 10/2018 | Morgan | G06Q 20/20 |
| 2018/0300703 A1* | 10/2018 | Hiramatsu | G06K 7/1417 |
| 2018/0350183 A1* | 12/2018 | Sato | G07D 11/34 |
| 2019/0073854 A1 | 3/2019 | Machida et al. | |

* cited by examiner

FIG.2A

APPARATUS INVENTORY INFORMATION

| DENOMI-NATION | QUANTITY | REPLENISHMENT THRESHOLD QUANTITY | COLLECTION THRESHOLD QUANTITY | ... |
|---|---|---|---|---|
| 10,000 | 100 | — | 400 | ... |
| 5,000 | 152 | 50 | 450 | ... |
| ⋮ | | | | |

FIG.2B

VIRTUAL SAFE INFORMATION

| DENOMI-NATION | QUANTITY | MECHANICALLY COUNTED QUANTITY | MANUALLY COUNTED QUANTITY | ... |
|---|---|---|---|---|
| 10,000 | 12 | 0 | 12 | ... |
| 5,000 | 48 | 20 | 28 | ... |
| ⋮ | | | | |

FIG.3A
IN-STORE APPARATUS INVENTORY INFORMATION

| AREA | APPARATUS | DENOMI-NATION | QUANTITY | REPLENISHMENT THRESHOLD QUANTITY | COLLECTION THRESHOLD QUANTITY | ... |
|---|---|---|---|---|---|---|
| A01 | M101 | 10,000 | 100 | — | 400 | ... |
| | | 5,000 | 152 | 50 | 450 | |
| | | ⋮ | | | | |
| | M102 | 10,000 | 121 | — | 300 | ... |
| | | 5,000 | 241 | 100 | 350 | |
| | | ⋮ | | | | |
| | ⋮ | | | | | |
| A02 | M201 | 10,000 | ... | | | |
| | | 5,000 | | | | |
| | | ⋮ | | | | |
| | M202 | 10,000 | ... | | | |
| | | 5,000 | | | | |
| | | ⋮ | | | | |
| ⋮ | | | | | | |

FIG.3B
IN-STORE VIRTUAL SAFE INFORMATION

| AREA | DENOMI-NATION | QUANTITY | MECHANICALLY COUNTED QUANTITY | MANUALLY COUNTED QUANTITY | ... |
|---|---|---|---|---|---|
| A01 | 10,000 | 12 | 0 | 12 | ... |
| | 5,000 | 48 | 20 | 28 | |
| | ⋮ | | | | |
| A02 | 10,000 | 43 | 30 | 13 | ... |
| | 5,000 | 68 | 60 | 8 | |
| | ⋮ | | | | |
| ⋮ | | | | | |

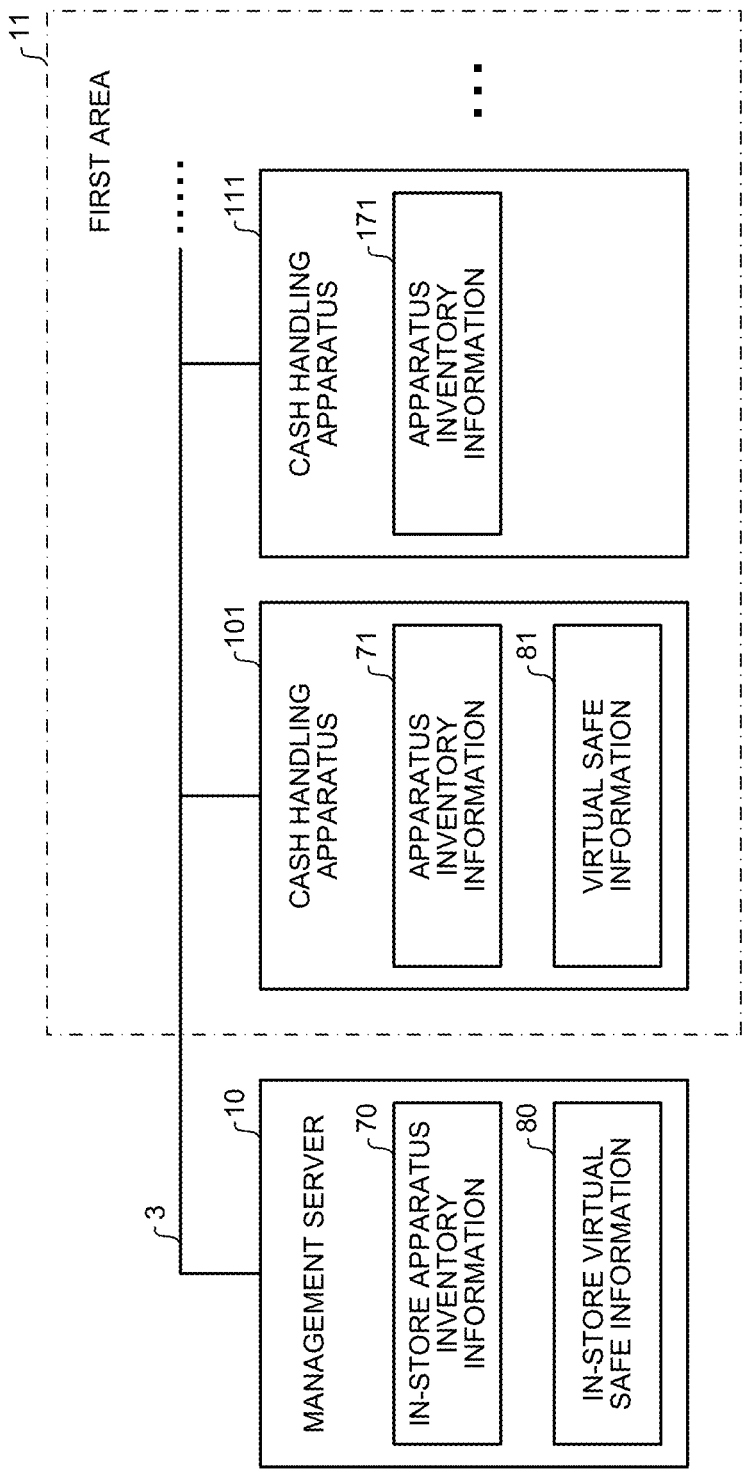

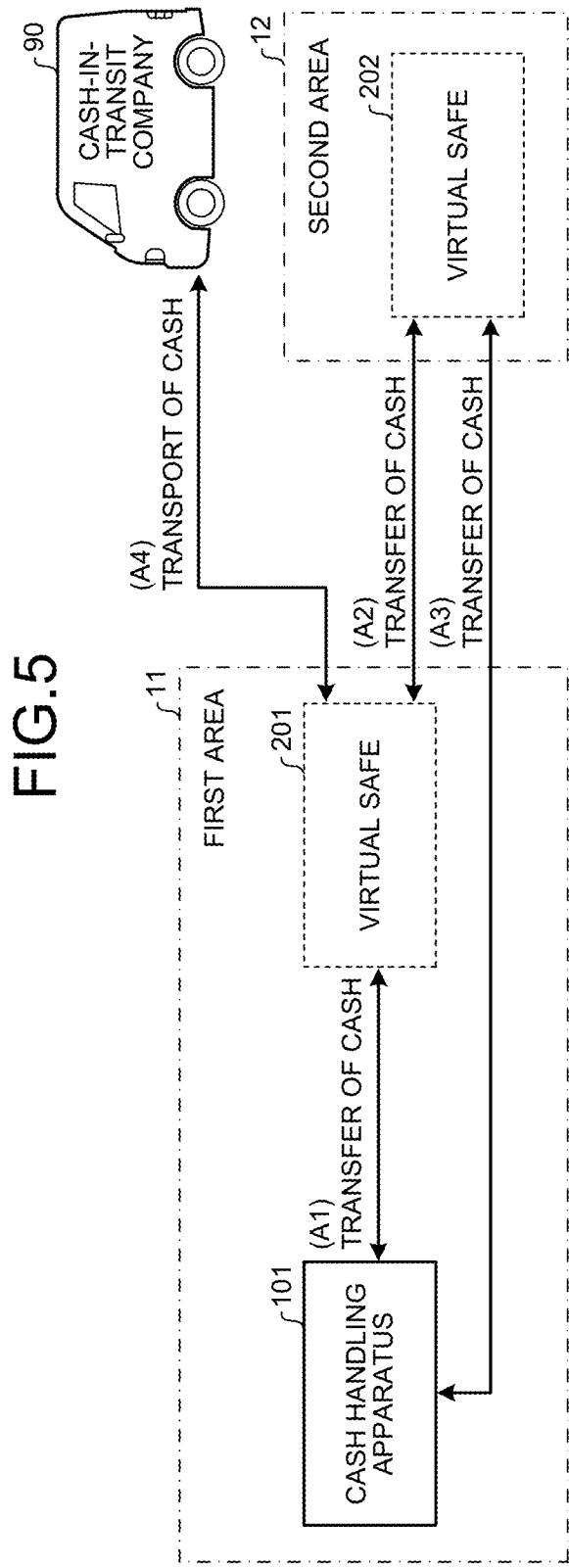

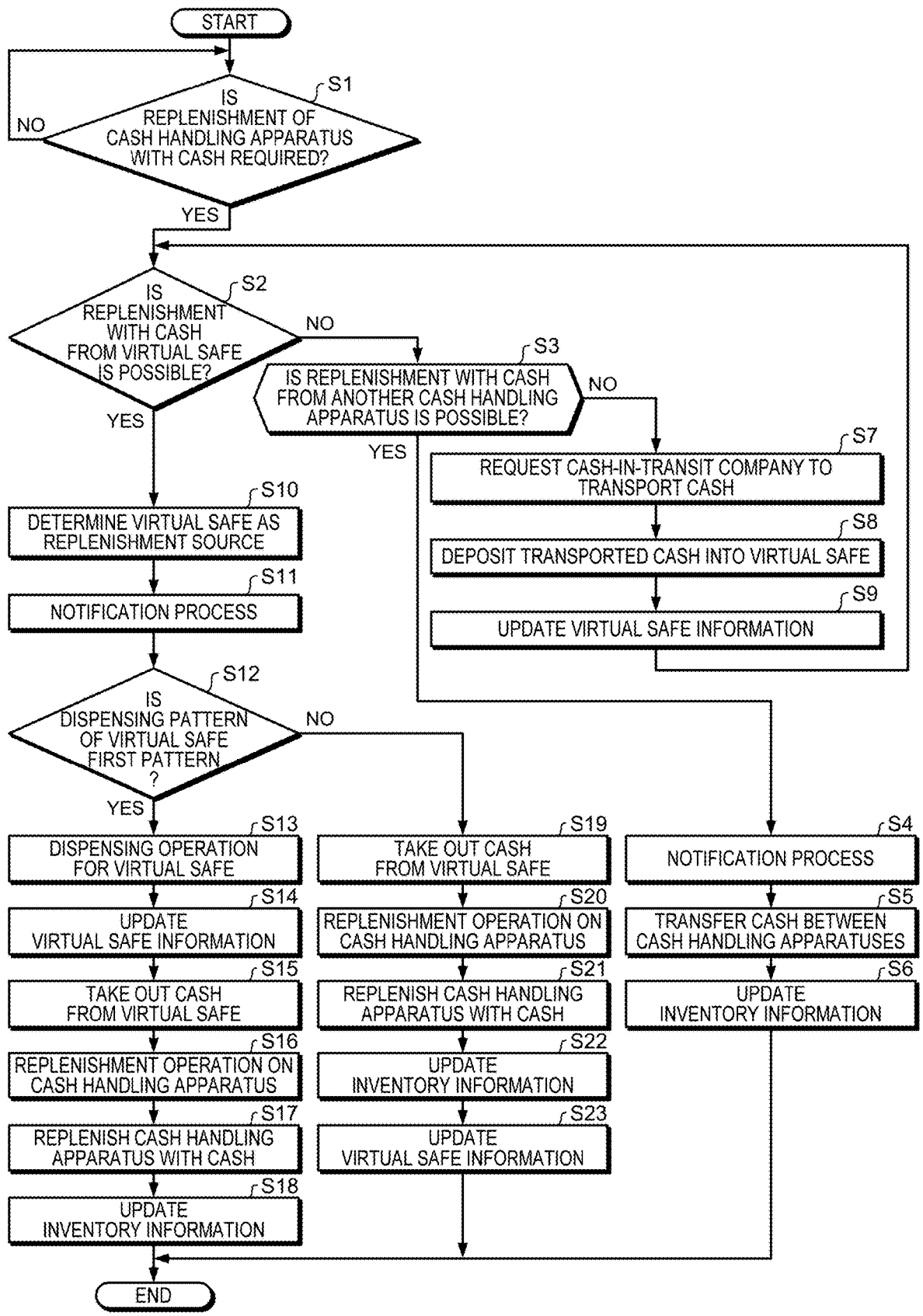

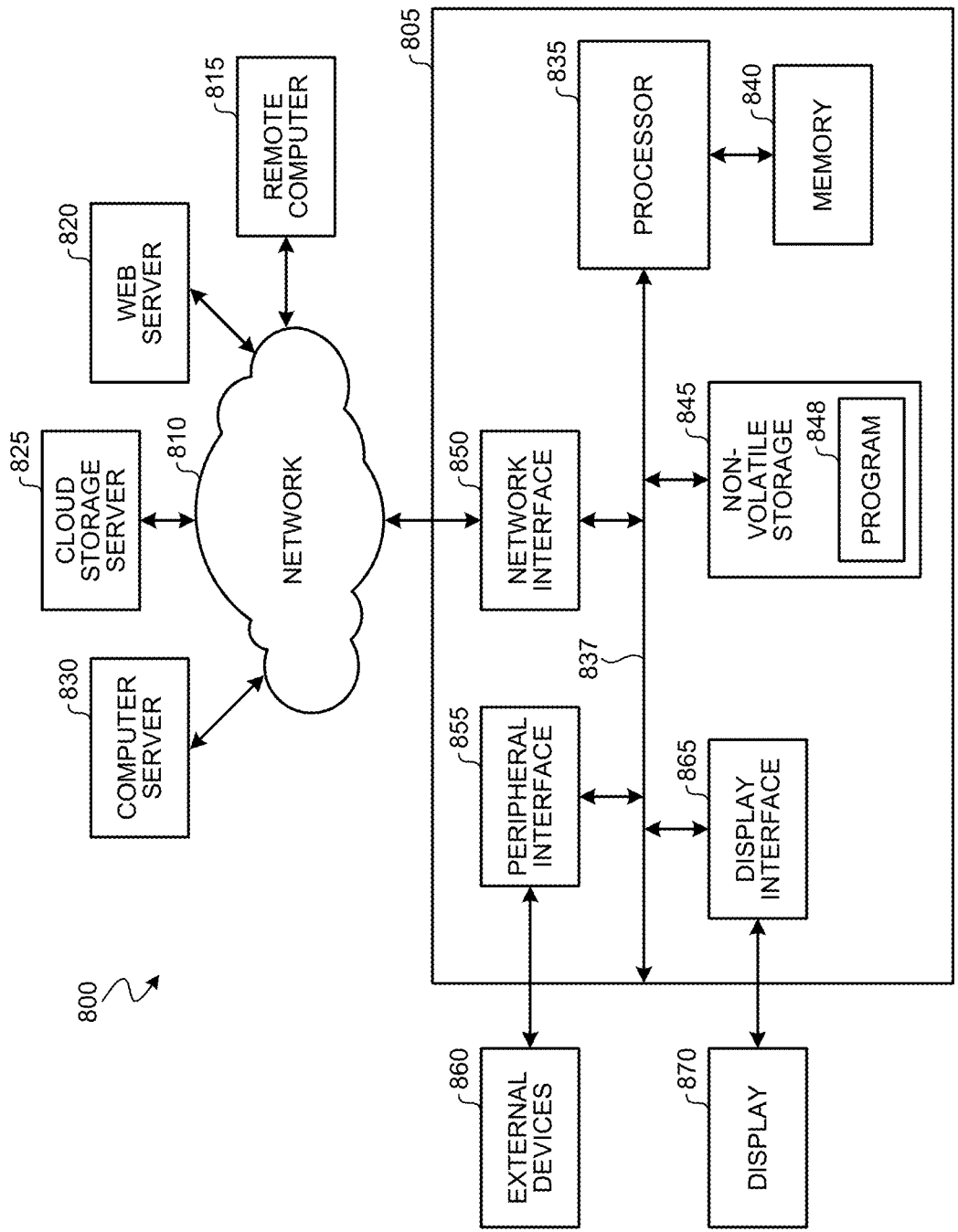

CASH MANAGEMENT APPARATUS, CASH MANAGEMENT SYSTEM, AND CASH MANAGEMENT METHOD

CROSS REFERENCE TO RELATED APPLICATION

The present application is based on and claims priority to Japanese Patent Application No. 2020-005309 filed on Jan. 16, 2020. The entire disclosure of the above-identified application, including the specification, drawings and claims is incorporated herein by reference and its entirety.

TECHNICAL FIELD

The present disclosure relates to a cash management apparatus, a cash management system, and a cash management method that manage information of cash present in a plurality of areas.

BACKGROUND ART

Conventionally, a cash management system for managing cash present in a store has been used. For example, Japanese Patent No. 5728362 discloses a system that manages the inventory quantity of cash in an apparatus that recognizes and counts cash and stores the cash by kind, and the inventory quantity of cash that is managed in the store without being stored in the apparatus. Since the system manages the cash that a clerk manages at hand as well as the cash that is stored in the apparatus, the system can manage all the cash present in the store.

SUMMARY

In the conventional art described above, however, information of the cash that the clerk keeps at hand (manually managed cash) is collectively managed in the system. Therefore, if manually managed cash is present in each of a plurality of areas in the store, information of the cash manually managed in the respective areas cannot be distinguished from each other. For example, if manually managed cash is present in each of a plurality of sections in the store, information of the cash in each section cannot be known.

The present disclosure is made in view of the problem of the conventional art. The present disclosure addresses issues, as discussed herein, with a cash management apparatus, a cash management system, and a cash management method that are able to acquire information of cash manually managed in a plurality of areas without being stored in cash handling apparatuses and to manage the information of the cash present in the respective areas.

The present disclosure provides a cash management apparatus including: a communication interface configured to acquire information of cash stored in a cash handling apparatus and information of cash kept outside the cash handling apparatus; a memory configured to store the information of the cash stored in the cash handling apparatus, and store the information of the cash kept outside the cash handling apparatus as information of cash kept in a virtual safe; and processing circuitry configured to output the information, of the cash kept in the virtual safe, which is stored in the memory, to notify a user. A plurality of pieces of information, each of which is information of cash kept in each of a plurality of virtual safes, is stored in the memory.

BRIEF DESCRIPTION OF THE DRAWINGS

FIGS. 2A and 2B show examples of apparatus inventory information and virtual safe information, respectively;

FIGS. 3A and 3B show examples of in-store apparatus information and in-store virtual safe information, respectively;

FIG. 4 shows an example of a case where a plurality of cash handling apparatuses are installed in one area;

FIG. 5 illustrates an example of a cash management method performed by a management server;

FIG. 6 is a flowchart illustrating a cash replenishment process executed between areas;

FIG. 8 is a block diagram of computer-based circuitry that may be used to implement control features of the present disclosure.

DETAILED DESCRIPTION

Hereinafter, a cash management apparatus, a cash management system, and a cash management method according to an embodiment of the present disclosure will be described with reference to the drawings. The cash management apparatus and the cash management system including the cash management apparatus can be used in various places. For example, the cash management apparatus and the cash management system can be used in public facilities such as a station and a city office, sightseeing facilities such as a theme park, and commercial facilities such as a shopping mall. In this embodiment, a case where the apparatus and the system are used in a store, in which transactions with customers are performed, is described.

Figure 1:
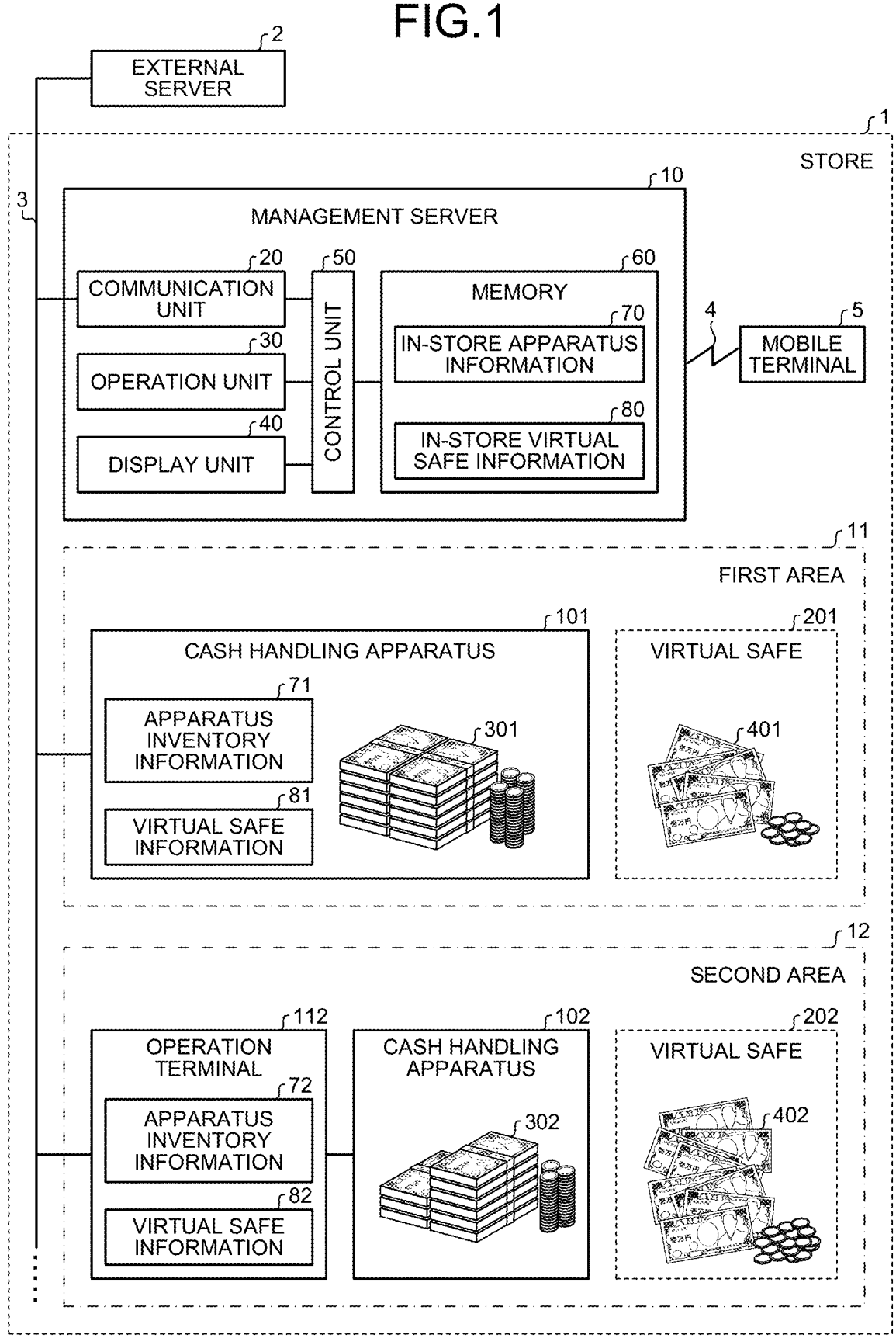
FIG. 1 shows an example of a configuration of a cash management system according to an embodiment of the present embodiment.

FIG. 1 shows an example of the configuration of the cash management system according to the present embodiment. The cash management system includes: a management server (cash management apparatus) 10 installed in a store 1; cash handling apparatuses 101, 102 installed in a plurality of areas 11, 12 in the store 1, respectively; and an operation terminal 112 used for controlling the cash handling apparatus 102. For ease of description, one cash handling apparatus 101 (102) is installed in each area 11 (12), but the number of cash handling apparatuses in each area 11 (12) is not particularly limited. Also, the number of areas in the store 1 is not particularly limited and may be 3 or more. For example, when the store 1 has a plurality of sections, the cash management system may be constructed such that each section corresponds to each area. For another example, when the store 1 is a building having a plurality of floors, the cash management system may be constructed such that each floor corresponds to each area shown in FIG. 1. Note that each of the management server (cash management apparatus) 10; cash handling apparatuses 101, 102; and an operation terminal 112 may be configured as a computing device as depicted in FIG. 8.

The cash handling apparatus 101 includes an operation unit and a display unit. A store clerk in charge of the first area 11 uses the cash handling apparatus 101 to perform depositing and dispensing by operating the operation unit. A store clerk in charge of the second area 12 uses the cash handling apparatus 102 to perform depositing and dispensing by operating the operation terminal 112 connected to the cash handling apparatus 102. The operation terminal 112 may be a computer device. The operation terminal 112 includes an operation unit and a display unit. In depositing, each of the cash handling apparatuses 101, 102 takes cash received through an inlet into the apparatus, recognizes and counts the cash, and stores the cash in one or more storage units inside the apparatus. For example, the deposited cash is stored, for each denomination, in a plurality of storage units inside the apparatus. In dispensing, each of the cash handling apparatuses 101, 102 feeds out cash, which is to be dispensed, from one or more storage units, and discharges the cash outside the apparatus through an outlet.

Although FIG. 1 shows two types of cash handling apparatuses, i.e., the first type is the cash handling apparatus 101 having the operation unit and the display unit and the second type is the cash handling apparatus 102 connected to the operation terminal 112 having the operation unit and the display unit, the types of the cash handling apparatuses are not particularly limited. At least one of the two types may be used in each area. Cash to be handled by the cash handling apparatuses 101, 102 may be only banknotes, only coins, or both banknotes and coins. The configurations and operations of the cash handling apparatuses 101, 102 capable of executing depositing and dispensing and the configuration and operation of the operation terminal 112 used for controlling the cash handling apparatus 102 have been well known and therefore, detailed descriptions thereof are omitted. Since various cash handlings including depositing and dispensing performed by using the apparatus have also been well known, detailed description thereof is omitted.

In the first area 11, the cash handling apparatus 101 takes cash into the apparatus, recognizes and counts the cash, and stores the cash in storage units disposed inside the apparatus. As shown in FIG. 1, in the first area 11, the cash handling apparatus 101 manages cash 301 stored inside the apparatus. The cash handling apparatus 101 stores, in a memory, information of the cash 301 stored in the apparatus, and manages the stored information as apparatus inventory information 71.

Some cash 401 present in the first area 11 is managed by hand (manually) by a clerk, instead of being stored in the cash handling apparatus 101. The cash handling apparatus 101 serves as an input device with which the clerk inputs information of cash to be manually managed in the first area 11. The clerk operates the operation unit of the cash handling apparatus 101 to input the information of the cash to be manually managed. The information to be inputted into the cash handling apparatus 101 by the clerk includes information indicating denominations of the cash to be manually managed and the quantity for each of the denominations. Thus, the cash handling apparatus 101 can manage the denominations of all the cash 401 manually managed in the first area 11, and information for each of the denominations.

The cash handling apparatus 101 manages, in the memory inside the apparatus, the information of the cash 401, on an assumption that the cash 401 manually managed by the clerk is kept in a virtual safe 201 provided in the first area 11. The cash handling apparatus 101 handles an increase in the quantity of the cash manually managed by the clerk, as depositing of cash in the virtual safe 201. The cash handling apparatus 101 handles a decrease in the quantity of cash manually managed by the clerk, as dispensing of cash from the virtual safe 201.

The term "manual" management is a conception including a management method in which a clerk does not store cash in a cash handling apparatus constituting a cash management system but manages the cash outside the cash handling apparatus. The term "virtual safe" is a conception including a place, an equipment, and a container that are used to keep cash manually managed outside a cash handling apparatus of a cash management system.

When the clerk keeps cash in a predetermined place and manually manages the cash, this place is regarded as a virtual safe. A room where cash is kept may be regarded as a virtual safe. When the clerk stores cash in cash storage equipment having no cash recognition/counting function and manually manages the stored cash, this equipment is regarded as a virtual safe. For example, equipment such as a safe is regarded as a virtual safe. When the clerk stores cash in a container and manually manages the stored cash, this container is regarded as a virtual safe. For example, a container such as a cabinet, a drawer, a box, and a bag is regarded as virtual safes. Hereinafter, storage of cash using a place, an equipment, a container, or the like other than the cash handling apparatus may be referred to storage of cash using a virtual safe.

In the cash handling apparatus 101, the information of the manually managed cash 401 is managed in the memory inside the apparatus so as to be distinguishable from the information of the cash 301 being stored in the storage unit inside the apparatus. The information of the manually managed cash 401, i.e., the information of the cash 401 present in the virtual safe 201, is managed as virtual safe information 81.

FIGS. 2A and 2B show examples of the apparatus inventory information 71 and the virtual safe information 81, respectively. As shown in FIG. 2A, the apparatus inventory information 71 includes denominations and the quantity for each denomination of the cash 301 being stored inside the cash handling apparatus 101. In addition, the apparatus inventory information 71 includes a replenishment threshold quantity and a collection threshold quantity that are set for each denomination.

The replenishment threshold quantity is a threshold value for determining whether or not the cash handling apparatus 101 needs to be replenished with cash. When cash stored in the cash handling apparatus 101 is dispensed and the storage quantity of cash of a certain denomination in the apparatus becomes less than the replenishment threshold quantity, the cash handling apparatus 101 determines that replenishment with cash of this denomination is required. Each time cash is dispensed from the cash handling apparatus 101, it is determined, for each denomination, whether or not replenishment with cash is required. The cash handling apparatus 101, having determined that replenishment with cash is required, executes a notification process of notifying the clerk of this fact. For example, the cash handling apparatus 101 displays, on the display unit, information indicating that a replenishment process is to be performed. The cash handling apparatus 101 may emit sound and/or light for the notification. The clerk checks the information on the display unit and performs a cash replenishment process. The cash handling apparatus 101 may transmit, to the management server 10, information indicating that the replenishment process is required. Based on the information received from the cash handling apparatus 101, the management server 10 may instruct the clerk to perform the cash replenishment process. Alternatively, the management server 10 may determine, in itself, whether or not replenishment of the cash handling apparatus 101 with cash is required. The cash replenishment process will be described later.

The collection threshold quantity is a threshold value for determining whether or not collection of cash from the cash handling apparatus 101 is required. When cash is deposited in the cash handling apparatus 101 and the storage quantity of cash of a certain denomination in the apparatus exceeds the collection threshold quantity, the cash handling apparatus 101 determines that the cash of this denomination has to be collected therefrom. Each time cash is deposited in the cash handling apparatus 101, it is determined, for each denomination, whether or not collection of cash is required. The cash handling apparatus 101, having determined that collection of cash is required, executes a notification process of notifying the clerk of this fact. The clerk checks information on the display unit and performs a cash collection process. The cash handling apparatus 101 may notify the management server 10 that the collection process is required, and the management server 10 may instruct the clerk to perform the cash collection process. Alternatively, the management server 10 may determine, in itself, whether or not collection of cash from the cash handling apparatus 101 is required. The cash collection process will be described later.

As shown in FIG. 2B, the virtual safe information 81 includes denominations and the quantity for each denomination of the cash 401 managed in the virtual safe 201 of the first area 11. The virtual safe information 81 further includes a mechanically counted quantity and a manually counted quantity for each denomination. The mechanically counted quantity indicates the quantity of cash recognized and counted by the cash handling apparatus. The manually counted quantity is the quantity of cash manually counted by the clerk. The sum of the mechanically counted quantity and the manually counted quantity equals to the quantity of cash for each denomination.

When the clerk transfers cash between the cash handling apparatus 101 and the virtual safe 201 of the same area, the transferred cash is processed by the cash handling apparatus 101. The cash handling apparatus 101 updates the apparatus inventory information 71 and the virtual safe information 81, based on a recognition and counting result of the transferred cash.

For example, in a case where the clerk executes the collection process by operating the operation unit of the cash handling apparatus 101 to collect twenty 10,000-JPY notes from the cash handling apparatus 101 into the virtual safe 201, the cash handling apparatus 101 dispenses twenty 10,000-JPY notes to be collected. The cash handling apparatus 101, having dispensed the cash, reduces the number of 10,000-JPY notes by twenty in an item of "quantity" in the apparatus inventory information 71 shown in FIG. 2A. The cash handling apparatus 101, having recognized that the dispensed cash is collected into the virtual safe 201, increases the number of 10,000-JPY notes by twenty in an item of "quantity" in the virtual safe information 81 shown in FIG. 2B. The twenty 10,000-JPY notes increased in the virtual safe information 81 at this time have been recognized and counted by the cash handling apparatus 101 in at least one of a depositing process to store these banknotes in the cash handling apparatus 101 and a dispensing process to dispense these banknotes from the cash handling apparatus 101. Therefore, the cash handling apparatus 101 increases the number of 10,000-JPY notes by twenty in an item of "mechanically counted quantity" in the virtual safe information 81.

For example, in a case where the clerk executes the replenishment process by operating the operation unit of the cash handling apparatus 101 to replenish the cash handling apparatus 101 with fifty 1,000-JPY notes that have been manually managed in the virtual safe 201, the cash handling apparatus 101 recognizes and counts fifty 1,000-JPY notes for replenishment, and stores the banknotes in the storage unit inside the apparatus. The cash handling apparatus 101 replenished with the cash increases the number of 1,000-JPY notes by fifty in the item of "quantity" in the apparatus inventory information 71 shown in FIG. 2A. The cash handling apparatus 101, having recognized that the apparatus is replenished with the cash taken out from the virtual safe 201, decreases the number of 1,000-JPY notes by fifty in the item of "quantity" in the virtual safe information 81 shown in FIG. 2B. The fifty 10,000-JPY notes decreased in the virtual safe information 81 at this time have been recognized and counted by the cash handling apparatus 101 for the replenishment process. Therefore, the cash handling apparatus 101 decreases the number of 1,000-JPY notes by fifty in the item of "mechanically counted quantity" in the virtual safe information 81.

The clerk may receive cash from a customer in the store and manage the cash in the virtual safe 201. When the cash manually managed in the virtual safe 201 is increased, the clerk inputs denominations and the quantity for each denomination of the cash into the cash handling apparatus 101. Based on the inputted information, the cash handling apparatus 101 updates the virtual safe information 81.

When starting manual management of cash in the virtual safe 201, the clerk counts the cash manually and operates the operation unit of the cash handling apparatus 101 to input the information on the counted result. For example, when three 10,000-JPY notes are to be added in the virtual safe 201 to start manual management of these banknotes, the clerk inputs "three 10,000-JPY notes" as the information on the cash. Upon recognizing that the cash manually counted by the clerk has been added, i.e., deposited, in the virtual safe 201, the cash handling apparatus 101 increases the number of 10,000-JPY notes by three in the item of "quantity" in the virtual safe information 81 shown in FIG. 2B. The increment of three of 10,000-JPY notes increased in the virtual safe information 81 at this time is not the mechanically counted number but the number manually counted by the clerk. Therefore, the cash handling apparatus 101 increases the number of 10,000-JPY notes by three in the item of "manually counted quantity" in the virtual safe information 81.

The clerk may take out cash from the virtual safe 201 and give the cash to a customer. For example, when a customer purchases an item in the store 1 and the clerk needs to return change to the customer, the clerk may take out some cash from the virtual safe 201 to be used as the change. When the cash manually managed in the virtual safe 201 decreases, the clerk inputs denominations and the quantity for each denomination of the cash to the cash handling apparatus 101. Based on the inputted information, the cash handling apparatus 101 updates the virtual safe information 81.

When ending manual management of cash in the virtual safe 201, the clerk counts the cash manually and operates the operation unit of the cash handling apparatus 101 to input the information on the counted result. For example, when two 10,000-JPY notes are takes out from the virtual safe 201 to end the manual management of these banknotes, the clerk inputs "two 1,000-JPY notes" as the information of the cash. Upon recognizing that the cash manually counted by the clerk has been taken out, i.e., dispensed, from the virtual safe 201, the cash handling apparatus 101 decreases the number of 1,000-JPY notes by two in the item of "quantity" in the virtual safe information 81 shown in FIG. 2B. The decrement of two of 10,000-JPY notes decreased in the virtual safe 201 at this time is not the mechanically counted number but the number manually counted by the clerk. Therefore, the cash handling apparatus 101 decreases the number of 1,000-JPY notes by two in the item of "manually counted quantity" in the virtual safe information 81.

The cash handling apparatus 101 may determine whether or not cash for replenishment should be dispensed from the virtual safe 201 and whether or not cash to be collected should be deposited in the virtual safe 201 based on a menu selected by the clerk operating the cash handling apparatus 101. Likewise, the cash handling apparatus 101 may determine whether or not the information of cash inputted to the cash handling apparatus 101 is information on cash to be deposited in the virtual safe 201 and whether or not the inputted information is information on cash to be dispensed from the virtual safe 201 based on a menu selected by the clerk.

For example, a cash processing menu displayed on the display unit of the cash handling apparatus 101 includes four options, i.e., "replenishment from virtual safe", "collection into virtual safe", "depositing in virtual safe", and "dispensing from virtual safe". When the clerk selects "replenishment from virtual safe", the cash handling apparatus 101 recognizes that cash in the virtual safe 201 is supplied to the apparatus and cash in the virtual safe 201 decreases. When the clerk selects "collection into virtual safe", the cash handling apparatus 101 recognizes that cash in the apparatus is collected into the virtual safe 201 and cash in the virtual safe 201 increases. When the clerk selects "depositing in virtual safe", the cash handling apparatus 101 recognizes that cash manually counted by the clerk is added to the virtual safe 201 and cash in the virtual safe 201 increases. When the clerk selects "dispensing from virtual safe", the cash handling apparatus 101 recognizes that cash manually counted by the clerk is taken out from the virtual safe 201 and cash in the virtual safe 201 decreases.

In the second area 12, as in the first area 11, some cash 302 is stored and managed in the cash handling apparatus 102 while some cash 402 is manually managed in the virtual safe 202. That is, the cash 402 is not stored in the cash handling apparatus 102 but is manually managed outside the apparatus by the clerk. Information of the cash 302 having been recognized, counted, and stored in the cash handling apparatus 102 is managed as apparatus inventory information 72 in the memory inside the operation terminal 112.

In the second area 12, the operation terminal 112 connected to the cash handling apparatus 102 serves as an input device that allows the clerk to input information of cash that is manually managed by the clerk in the area 12. The clerk operates the operation unit of the operation terminal 112 to input information of the cash 402 to be manually managed. The information to be inputted by the clerk includes information for specifying denominations and the quantity for each denomination of the cash to be manually managed. Thus, the operation terminal 112 can manage denominations of all the cash 402 manually managed in the second area 12, and information for each of the denominations.

The operation terminal 112 regards that the cash 402 manually managed by the clerk is kept in the virtual safe 202 provided in the second area 12. The operation terminal 112 manages information of the cash 402 as virtual safe information 82 so as to be distinguishable from information of the cash 302 stored in the cash handling apparatus 102.

Like the apparatus inventory information 71 shown in FIG. 2A, the apparatus inventory information 72 includes denominations, the quantity for each denomination, a replenishment threshold quantity, and a collection threshold quantity of the cash 302 stored in the cash handling apparatus 102. Like the virtual safe information 81 shown in FIG. 2B, the virtual safe information 82 includes denominations, the quantity for each denomination, a mechanically counted quantity, and a manually counted quantity of the cash 402 present in the virtual safe 202 of the second area 12.

In the second area 12, as in the first area 11, cash can be transferred between the cash handling apparatus 102 and the virtual safe 202 of the same area 12, and the apparatus inventory information 72 and the virtual safe information 82 are updated based on cash processed in the transfer. The process performed at this time is identical to the process performed in the first area 11 except that the clerk performs an operation on the operation terminal 112 and that updates of the apparatus inventory information 72 and the virtual safe information 82 are performed in the operation terminal 112.

The management server 10 shown in FIG. 1 may be a computer device. The management server 10 includes a communication unit 20, an operation unit 30, a display unit 40, a control unit 50, and a memory 60. The management server 10 serves as a cash management apparatus that manages cash in the store 1.

The communication unit 20 exchanges information with external devices through wired communication or wireless communication. The communication unit 20 exchanges information with the cash handling apparatus 101 and the operation terminal 112 placed in the store 1, via a network 3. In addition, the communication unit 20 exchanges information with an external server 2 placed outside the store 1, via the network 3. The external server 2 is, for example, a computer device used by a cash-in-transit company that transports cash between the store 1 and a financial facility. In addition, the communication unit 20 exchanges information with a mobile terminal 5 being carried by the clerk, through wireless communication. The mobile terminal 5 is, for example, a smart phone or a tablet having a touch panel type liquid crystal display device. Although one external server 2 and one mobile terminal 5 are shown in FIG. 1, the number thereof is not particularly limited.

The operation unit 30 is used for inputting various information to the management server 10. For example, a keyboard and a mouse are used as the operation unit 30. The display unit 40 is used by the management server 10 to output and display various information. For example, a liquid crystal display device is used as the display unit 40. The control unit 50 controls the respective units while using information stored in the memory 60, based on information inputted through the operation unit 30 and/or information inputted from an external device through the communication unit 20. The control unit 50 controlling the respective components realizes the function and operation of the management server 10 described in the present embodiment.

The memory 60 is a non-volatile storage device. The memory 60 is used for storing various information to be used by the control unit 50. By using the memory 60, the control unit 50 can manage information of cash present in a plurality of areas, separately for each area. In addition, the control unit 50 can manage separately information of cash stored in one or more cash handling apparatuses in the area and information of cash being manually managed in the virtual safe in the area, separately. Information stored in the memory 60 includes in-store apparatus information 70 and in-store virtual safe information 80. The in-store apparatus information 70 includes information of cash stored in each cash handling apparatus in the store 1. The in-store virtual safe information 80 includes information of cash manually managed in each virtual safe in the store 1.

The management server 10 acquires the apparatus inventory information 71 managed by the cash handling apparatus 101 in the first area 11, and the apparatus inventory information 72, of the cash handling apparatus 102, managed by the operation terminal 112 in the second area 12. The management server 10 manages the in-store apparatus information 70, based on the apparatus inventory information 71, 72 acquired from the cash handling apparatuses 101, 102. As for all the cash handling apparatuses installed in all the areas in the store 1, the management server 10 can acquire information of cash stored in the respective handling apparatuses and manage the information for each area and for each apparatus.

The management server 10 acquires the virtual safe information 81 managed by the cash handling apparatus 101 and the virtual safe information 82 managed by the operation terminal 112. That is, the management server 10 acquires virtual safe information from the input device in each area that is used for inputting information of cash being manually managed. The management server 10 manages the in-store virtual safe information 80, based on the virtual safe information 81, 82 acquired from the input devices 101, 112 in the areas 11, 12. As for all the areas in the store 1, the management server 10 can acquire information of cash being manually managed in each area and manage the information for each area FIGS. 3A and 3B show examples of the in-store apparatus information 70 and the in-store virtual safe information 80.

The in-store apparatus information 70 shown in FIG. 3A includes apparatus inventory information of each cash handling apparatus in the store 1. In an item of "area", an area ID (area identification information) for identifying each area is entered. In an item of "apparatus", an apparatus ID (apparatus identification information) for identifying each cash handling apparatus is entered. Information in items of "denomination", "quantity", "replenishment threshold quantity", and "collection threshold quantity" of the in-store apparatus information 70 correspond respectively to information of "denomination", "quantity", "replenishment threshold quantity", and "collection threshold quantity" of the apparatus inventory information managed in each cash handling apparatus as shown in FIG. 2A. When cash handling is performed in each cash handling apparatus and the apparatus inventory information is updated, information indicating the update is transmitted to the management server 10 from each cash handling apparatus and the in-store apparatus information 70 is updated. For example, the in-store apparatus information 70 is updated in real time to synchronize the apparatus inventory information of each cash handling apparatus and the in-store apparatus information 70 with each other.

FIG. 3A shows that an area whose area ID is "A01" and an area whose area ID is "A02" are included in the store 1. FIG. 3A also shows that cash handling apparatuses installed in the area having the area ID "A01" include a cash handling apparatus whose apparatus ID is "M101" and a cash handling apparatus whose apparatus ID is "M102". Likewise, FIG. 3A shows that cash handling apparatuses installed in the area having the area ID "A02" include a cash handling apparatus whose apparatus ID is "M201" and a cash handling apparatus whose apparatus ID is "M202". For each apparatus ID, apparatus inventory information of the corresponding cash handling apparatus is entered. That is, denominations and the quantity for each of the denominations of cash stored in each cash handling apparatus are managed in the in-store apparatus information 70.

The in-store virtual safe information 80 shown in FIG. 3B includes virtual safe information in each area. In an item of "area", the area ID of each area is entered. Information in items of "denomination", "quantity", "mechanically counted quantity", and "manually counted quantity" of the in-store virtual safe information 80 correspond respectively to information of "denomination", "quantity", "mechanically counted quantity", and "manually counted quantity" of the virtual safe information managed by the input device in each area as shown in FIG. 2B. When the virtual safe information is updated by the input device in each area, information indicating the update is transmitted to the management server 10 from the input device and the in-store virtual safe information 80 is updated. For example, the in-store virtual safe information 80 is updated in real time to synchronize the virtual safe information in each area and the in-store virtual safe information 80 with each other.

Even when a plurality of cash handling apparatuses are installed in one area, virtual safe information of each area may be managed by one input device. For example, one cash handling apparatus is used as an input device for all apparatuses in that area. Alternatively, for example, one operation terminal connected to the cash handling apparatus is used as an input device for all apparatuses in that area.

FIG. 4 shows a case where a plurality of cash handling apparatuses 101, 111 are installed in one area 11. As shown in FIG. 4, each cash handling apparatuses 101, 111 in the first area 11 manage information of cash present therein by using apparatus inventory information 71, 171 stored therein. Meanwhile, virtual safe information 81 is managed by one cash handling apparatus 101 in the first area 11 while the other cash handling apparatus 111 does not manage virtual safe information inside the apparatus. The management server 10 acquires the apparatus inventory information 71 of the cash handling apparatus 101 and the apparatus inventory information 171 of the cash handling apparatus 111 via the network 3, and manages the information 71, 171 in the in-store apparatus information 70. In addition, the management server 10 acquires the virtual safe information 81 from the cash handling apparatus 101 via the network 3 and manages the information 81 in the in-store virtual safe information 80.

The management server 10 manages cash present in the store 1 by using the in-store apparatus information 70 and the in-store virtual safe information 80. FIG. 5 illustrates an example of a cash management method performed by the management server 10. As described above, the management server 10 can manage transfer of cash (A1) between the cash handling apparatus 101 and the virtual safe 201 in the same area 11.

The management server 10 monitors the inventory quantity of cash in each cash handling apparatus, based on the in-store apparatus information 70. For example, when the storage quantity of cash in a cash handling apparatus decreases and becomes less than the replenishment threshold quantity, the management server 10 transmits, to the mobile terminal 5 of the clerk, information instructing the clerk to replenish the cash handling apparatus with cash taken out from the virtual safe in the same area. The cash handling apparatus to be replenished with cash, the area where the cash handling apparatus is installed, and denominations and the quantity for each denomination of cash for replenishment are indicated by information displayed on the screen of the mobile terminal 5. The clerk, having checked the information on the mobile terminal 5, replenishes the cash handling apparatus with cash taken out from the virtual safe of the same area, as described above.

For example, when the storage quantity of cash in a cash handling apparatus increases and exceeds the collection threshold quantity, the management server 10 transmits, to the mobile terminal 5 of the clerk, information instructing the clerk to collect cash from the cash handling apparatus and store into the virtual safe in the same area. The cash handling apparatus that requires collection of cash, the area where the cash handling apparatus is installed, and denominations and the quantity for each denomination of cash to be collected are indicated by information displayed on the screen of the mobile terminal 5. The clerk, having checked the information on the mobile terminal 5, collects cash from the cash handling apparatus and stores into the virtual safe of the same area, as described above.

The management server 10 also manages transfer of cash between different areas. Specifically, as shown in FIG. 5, the management server 10 manages transfer of cash (A2) between the virtual safes 201, 202 in different areas 11, 12. In addition, the management server 10 manages transfer of cash (A3) between the cash handling apparatus 101 and the virtual safe 202 in different areas 11, 12.

As shown in FIG. 5, the management server 10 may also manage transport of cash (A4) between the store 1 and a cash-in-transit company 90. Specifically, when shortage of cash occurs in the store 1, the management server 10 detects this fact and transmits, to an external server 2 used by the cash-in-transit company 90, information requesting transport of cash to the store 1. That is, the management server 10 transmits to an external server 2 information requesting transport of cash from outside the areas of the store 1. Based on the information received at the external server 2, the cash-in-transit company 90 recognizes denominations and the quantity for each denomination of cash requested by the store 1, and transports the requested cash to the store 1. Meanwhile, when cash in the store 1 needs to be transported to a financial facility, the management server 10 detects this fact and transmits, to the external server 2, information requesting collection of cash from the store 1. Based on the information received at the external server 2, the cash-in-transit company 90 collects cash from the store 1 and transports the collected cash to the financial facility.

The management server 10 can provide the clerk with various information by using the in-store apparatus information 70 and the in-store virtual safe information 80 managed in the memory 60. The kinds of information to be displayed by the management server 10 and the information display manner can be changed by settings.

For example, the management server 10 may display, on the display unit 40, information of cash being stored in each cash handling apparatus in the store 1. For example, the management server 10 displays denominations of cash stored in the cash handling apparatus, the quantity and amount of cash for each denomination, the total quantity of the cash, and the total amount of the cash.

The management server 10 may display, on the display unit 40, information of cash manually managed in each virtual safe in the store 1. For example, the management server 10 displays denominations of cash manually managed in the virtual safe, the quantity and amount of cash for each denomination, the total quantity of the cash, and the total amount of the cash.

The management server 10 may display, on the display unit 40, information of cash present in an area. For example, the management server 10 aggregates information of cash stored in all cash handling apparatuses installed in an area and information of cash in the virtual safe present in the area to display denominations of cash in the area, the quantity and amount of cash for each denomination, the total quantity of the cash, and the total amount of the cash. Thus, the information of cash being stored in the cash handling apparatuses and the information of cash being manually managed in the virtual safe, are displayed as the information of cash present in the area.

For example, by operating the operation unit 30, the clerk can cause the display unit 40 to display, in a list, information of cash stored in all the cash handling apparatuses in the store 1. The clerk can also cause the display unit 40 to display, in a list, information of cash being manually managed in the virtual safes in all the areas in the store 1. The clerk can also cause the display unit 40 to display, in a list, information of cash, in each area, including cash in each cash handling apparatuses and cash in each virtual safe. The clerk can select information to be displayed on the display unit 40 from among the information of cash in the cash handling apparatuses, the information of cash in the virtual safe, and the information of cash, in the area, which is the total of the cash in the apparatuses and the cash in the virtual safe. When displaying information of a plurality of areas on the display unit 40, the management server 10 may display information of the respective areas in different colors. Thus, the clerk can easily distinguish the information of the respective areas from each other. The clerk can check: information of cash stored in the respective cash handling apparatuses in an area; information of cash manually managed in a virtual safe in the same area; and information of all cash, in the area, which is the total of the cash in the apparatuses and the cash in the virtual safe. The clerk can compare the information of one area with information of cash in another area.

For example, the clerk can select one area in the store 1 by operating the operation unit 30 to display, on the display unit 40, a list of information of cash stored in the respective cash handling apparatuses in the selected area. The display unit 40 may also display information of cash manually managed in the virtual safe in the selected area. The display unit 40 may also display one of the information regarding the cash handling apparatuses and the information regarding the virtual safe, or both of them at the same time.

For example, the clerk can select one cash handling apparatus by operating the operation unit 30 to display, on the display unit 40, information of cash stored in the selected cash handling apparatus. The display unit 40 may also display information of cash being manually managed in a virtual safe in the area where the selected cash handling apparatus is installed. The display unit 40 may also display one of the information regarding the cash handling apparatuses and the information regarding the virtual safe, or both of them at the same time.

When information that satisfies a predetermined condition is present among the information displayed on the display unit 40, the management server 10 can notify the clerk of this information by displaying the information in a different manner from other information. For example, the information satisfying the predetermined condition is caused to flicker, is given a predetermined mark, or is displayed in a different color from other information to notify the clerk of the information.

For example, when a cash handling apparatus requiring replenishment with cash is present among the cash handling apparatuses displayed on the display unit 40, the management server 10 notifies the clerk that this apparatus requires replenishment with cash by displaying information of this apparatus distinguishably from other information. Meanwhile, for example, when a cash handling apparatus requiring collection of cash is present among the cash handling apparatuses displayed on the display unit 40, the management server 10 notifies the clerk that this apparatus requires collection of cash by displaying information of this apparatus distinguishably from other information.

Likewise, a condition may be set for cash in a virtual safe, and notification may be made when this condition is satisfied. For example, the clerk sets a lower-limit value on the total amount of cash managed in a virtual safe. When a virtual safe in which the total amount of cash is less than the lower-limit value is present among the virtual safes displayed on the display unit 40, the management server 10 notifies the clerk of information of this virtual safe, by displaying distinguishably from other information. Meanwhile, for example, the clerk sets an upper-limit value on the total amount of cash managed in a virtual safe. When a virtual safe in which the total amount of cash exceeds the upper-limit value is present among the virtual safes displayed on the display unit 40, the management server 10 notifies the clerk of information of this virtual safe, by displaying distinguishably from other information. The condition is not limited to a threshold value on the total amount of cash. For example, the clerk may select a denomination and set, as a threshold value, a quantity or amount of cash of the selected denomination.

The management server 10 may also output information on cash to an external device. For example, the management server 10 outputs the aforementioned various information to a printer connected to the management server 10 directly or via the network 3, and cause the printer to print out the various information. Alternatively, for example, the management server 10 outputs the aforementioned various information to an external device through wireless communication or wired communication via the network 3, and cause a display unit of the external device to display the various information. For example, at least one of: a portable terminal device such as a smart phone or a tablet; a stationary computer device; and a cash handling apparatus having a display unit is used as the external device. When outputting the information to the external device, the management server 10 may output a plurality of kinds of information separately for each kind so as to be displayed for each kind on the display unit of the external device.

Alternatively, the management server 10 may collectively output all the kinds of information, and the external device may display the information separately for each kind.

Next, transfer of cash between areas in the store 1 is described. FIG. 6 is a flowchart of a cash replenishment process executed between areas. The management server 10 monitors the storage quantity of cash in each of the cash handling apparatuses installed in the store 1, based on the in-store apparatus information 70 (step S1: No). For example, when the storage quantity of cash of a certain denomination becomes lower than the replenishment threshold quantity of the cash handling apparatus 101 in the first area 11, the management server 10 detects this fact and determines that the cash handling apparatus 101 needs to be replenished with cash (step S1: Yes). Alternatively, for example, when the management server 10 receives a notification from the cash handling apparatus 101 that has detected necessity of replenishment with cash, based on the apparatus inventory information 71, the management server 10 determines that the cash handling apparatus 101 needs to be replenished with cash. When the cash handling apparatus 101 can be replenished with cash supplied from the virtual safe 201 of the same area, transfer of cash is performed in this area as described above. However, the description will be continued for a case where cash for replenishment cannot be obtained in the same area.

The management server 10 checks information of cash being manually managed in the virtual safe in each area of the store 1, based on the in-store virtual safe information 80 (step S2). If cash for replenishing the cash handling apparatus 101 can be obtained from none of the virtual safes in the store 1 (step S2: No), the management server 10 checks information of cash stored in each of the cash handling apparatuses in the store 1, based on the in-store apparatus information 70 (step S3).

For example, when it is possible to dispense cash from the cash handling apparatus 102 in the second area 12 and replenish the cash handling apparatus 101 in the first area 11 with the dispensed cash (step S3: Yes), the management server 10 executes a notification of notifying the clerk of this fact (step S4). For example, the management server transmits, to the mobile terminal 5 of the clerk, information instructing the replenishment process. The information transmitted to the mobile terminal 5 includes: denominations and the quantity for each denomination of cash for replenishment; information indicating the cash handling apparatus 102 as a replenishment source and the second area 12 where the cash handling apparatus 102 is installed; and information indicating the cash handling apparatus 101 as a replenishment destination and the first area 11 where the cash handling apparatus 101 is installed. Upon checking the information on the mobile terminal 5, the clerk moves to the second area 12, and dispenses cash for replenishment from the cash handling apparatus 102. Then, the clerk moves to the first area 11, and replenishes the cash handling apparatus 101 with the cash having been dispensed from the cash handling apparatus 102 (step S5).

The cash handling apparatus 101 replenished with the cash recognizes and counts the cash, and stores the cash inside the apparatus. The cash handling apparatus 101 updates the apparatus inventory information 71 based on a recognition and counting result. The cash handling apparatus 101 transmits update information including the recognition and counting result to the management server 10. The management server 10 updates the in-store apparatus information 70, based on the received update information (step 6). In order to update the apparatus inventory information 72 of the cash handling apparatus 102 that is a replenishment source of the cash for replenishment, the management server 10 transmits the update information to the operation terminal 112. Based on the received update information, the operation terminal 112 updates the apparatus inventory information 72 of the cash handling apparatus 102 (step S6). Alternatively, when the clerk dispenses the cash for replenishment from the cash handling apparatus 102, the operation terminal 112 may update the apparatus inventory information 72, based on information on the dispensed cash.

If replenishment using cash stored in any cash handling apparatus in the store 1 is not possible (step S3: No), the management server 10 executes a process for requesting the cash-in-transit company 90 to transport cash to the store 1 (step S7). The management server 10 transmits, to the external server 2, information indicating the store 1, and information indicating denominations and the quantity for each denomination of cash to be transported to the store 1. For example, the external server 2 notifies a person in charge in the cash-in-transit company 90 that transport of cash to the store 1 is requested. Based on the information received at the external server 2, the cash-in-transit company 90 transports the requested cash to the store 1.

The cash transported to the store 1 by the cash-in-transit company 90 can be deposited and managed in a virtual safe in the store 1 (step S8). For example, when the clerk in the second area 12 receives the cash from the cash-in-transit company 90 and performs, with the operation terminal 112, an operation indicating arrival of the transported cash, the operation terminal 112 transmits, to the management server 10, information notifying the arrival of the cash. Upon receiving the notification, the management server 10 updates the in-store virtual safe information 80 (step S9). The management server 10 updates cash information, of the virtual safe 202 in the second area 12, which is managed in the in-store virtual safe information 80, based on the denominations and the quantity for each denomination of the cash whose transport was requested to the cash-in-transit company 90.

The management server 10 transmits, to the operation terminal 112 managing the virtual safe information 82 of the second area 12, information on the denominations and the quantity for each denomination of the cash whose transport was requested to the cash-in-transit company 90, and instructs the operation terminal 112 to update the virtual safe information 82, based on the transmitted information. The operation terminal 112 updates the virtual safe information 82, based on the information received from the management server 10 (step S9).

As described above, when the operation of indicating arrival of the transported cash at the store 1 is performed on the operation terminal 112 in the second area 12, the virtual safe information 82 and the in-store virtual safe information 80 are automatically updated, based on the denominations and the quantity for each denomination of the cash whose transport was previously requested from the management server 10 to the cash-in-transit company 90. Therefore, the clerk and the person in charge in the cash-in-transit company 90 need not input the information of the denominations and the quantity for each denomination of the cash transported to the store 1.

When cash for replenishing the cash handling apparatus 101 can be obtained from a virtual safe in another area in the store 1 (step S2: Yes), the management server 10 determines this virtual safe as a cash replenishment source (step S10).

For example, supposing a case where replenishment of the cash handling apparatus 101 with fifty 1,000-JPY notes is determined because the number of 1,000-JPY notes in the cash handling apparatus 101 becomes less than the replenishment threshold quantity. In this case, with reference to the in-store virtual safe information 80, the management server 10 specifies a virtual safe storing fifty or more 1,000-JPY notes managed manually.

If cash for replenishment can be obtained from any of a plurality of virtual safes, the management server 10 selects one virtual safe to be a cash replenishment source, based on a predetermined condition. For example, when the condition is set so as to select a virtual safe that makes a cash transfer distance shortest, the management server 10 selects a virtual safe in an area closest to the first area 11 from among a plurality of virtual safes from which the cash for replenishment can be obtained. For another example, when the condition is set so as to select a virtual safe in which the storage quantity of cash of the same denomination as the cash for replenishment is greatest, the management server 10 selects a virtual safe in which the storage number of 1,000-JPY notes is greatest from among the plurality of virtual safes from which the cash for replenishment can be obtained. The management server 10 searches for a virtual safe from which the cash for replenishment can be obtained, based on information in the item of "quantity" in the in-store virtual safe information 80.

Alternatively, it can be set that the management server 10 searches for a virtual safe, based on information in the item of "mechanically counted quantity" in the in-store virtual safe information 80. The information in the item of "quantity" in the in-store virtual safe information 80 includes the quantity of cash manually counted by the clerk. Therefore, there is a possibility that the information in the item of "quantity" is wrong due to miscount by the clerk. When the management server 10 determines, based on the mechanically counted quantity, whether or not the cash for replenishment can be obtained, it is possible to avoid a situation where, after determining the virtual safe as a replenishment source of fifty 1,000-JPY notes, all of the cash for replenishment cannot be obtained from the determined virtual safe because the virtual safe does not actually store fifty 1,000-JPY notes therein.

Alternatively, it can be set that a virtual safe is determined as a replenishment source by the clerk. In this setting, the management server 10 executes a notification process of notifying the clerk that a cash replenishment process is required. The information notified to the clerk includes: denominations and the quantity for each denomination of cash for replenishment; and information of an area of the virtual safe, from which the cash for replenishment may be obtainable, selected by the management server 10 based on the in-store virtual safe information 80. For example, the information is transmitted from the management server 10 to the mobile terminal 5 of the clerk. Based on the information received at the mobile terminal 5, the clerk recognizes that fifty 1,000-JPY notes are required as the cash for replenishment. In addition, based on the selection result of the management server 10, the clerk recognizes the virtual safe from which the cash for replenishment may be obtainable, and the area where the virtual safe is present. In this stage, the clerk can change the virtual safe to obtain the cash for replenishment, with reference to the in-store virtual safe information 80 by operating the mobile terminal 5.

The clerk moves to the area where the cash for replenishment may be obtainable, and checks cash being manually managed in this area. If there is an error in the item of "quantity" in the in-store virtual safe information 80 due to miscount by the clerk and therefore fifty 1,000-JPY notes cannot be obtained in this area, the clerk corrects the error and refers to the in-store virtual safe information 80 to find another virtual safe to be the replenishment source. After selecting a virtual safe from which the cash for replenishment can be obtained, the clerk moves to an area where the determined virtual safe is present. Alternatively, the clerk may obtain as much cash as possible in this first area and then obtain the shortage in another second area, which will be described later.

Update of virtual safe information in each area is performed by the clerk. For example, after cash in a virtual safe decreases because the clerk has given some cash having been manually managed in the virtual safe to a customer, the clerk may not immediately update the virtual safe information. It leads to a situation where information in the in-store virtual safe information 80 is different from actual information. Therefore, even when a virtual safe from which the cash for replenishment can be obtained is selected based on the in-store virtual safe information 80, there is a possibility that the cash for replenishment cannot actually be obtained from the selected virtual safe. Meanwhile, in the case where the clerk selects a virtual safe to be a replenishment source, since the clerk actually checks cash manually managed in the area, it is possible to reliably obtain the cash for replenishment from the selected virtual safe.

Upon confirming that fifty 1,000-JPY notes for replenishment are present in a virtual safe selected by the clerk, the clerk operates the mobile terminal 5 to transmit, to the management server 10, information indicating that this virtual safe is selected as the replenishment source instead of the virtual safe that has been selected by the management server 10. Based on the received information, the management server 10 determines the virtual safe, which has been selected by the clerk, to be the replenishment source.

When the virtual safe to be the replenishment source has been determined through the automatic determination by the management server 10 or the manual determination by the clerk, the management server 10 executes a notification process of notifying the clerk of the determination result (step S11). Hereinafter, the description will be continued for a case where the virtual safe 202 in the second area 12 is determined as the replenishment source and the cash handling apparatus 101 in the first area 11 is replenished with cash manually managed in the virtual safe 202 of the second area 12.

In the notification process, information required for a replenishment process is transmitted to the mobile terminal 5 of the clerk, for example. The information transmitted to the mobile terminal 5 includes: a replenishment ID (replenishment identification information) for identifying each replenishment process; denominations and the quantity for each denomination of cash for replenishment; information indicating the virtual safe 202 as a replenishment source and the second area 12 where the virtual safe 202 is present; and information indicating the cash handling apparatus 101 as a replenishment destination and the first area 11 where the cash handling apparatus 101 is installed. Even when a plurality of replenishment processes are executed in parallel in the store 1, replenishment IDs thereof allow the management server 10 to manage the respective replenishment processes to be distinguished from each other.

The clerk, having checked the information received at the mobile terminal 5, starts a process for transferring cash from the virtual safe 202 in the second area 12 to the cash handling apparatus 101 in the first area 11. Different processes are performed according to dispensing patterns previously set for the virtual safes in the store 1 (step S12). The dispensing patterns include: a first pattern in which both a dispensing operation in the virtual safe 202 as a replenishment source and a depositing operation (replenishment operation) in the cash handling apparatus 101 as a replenishment destination are required; and a second pattern in which only the depositing operation (replenishment operation) in the cash handling apparatus 101 as a replenishment destination is required. The same dispensing pattern may be set for all the virtual safes in the store 1, or different dispensing patterns may be set for the respective virtual safes.

In a case where the dispensing pattern of the virtual safe 202 in the second area 12 is set to the first pattern (step S12: Yes), the clerk performs a dispensing operation on the operation terminal 112 when dispensing cash from the virtual safe 202 (step S13). That is, when the clerk takes out cash, which is manually managed in the second area 12, from the second area 12, the clerk has to perform the dispensing operation on the operation terminal 112 in the second area 12. Specifically, the clerk has to operate the operation terminal 112 to input a replenishment ID previously received at the mobile terminal 5.

The operation terminal 112 transmits the inputted replenishment ID to the management server 10. Based on the received replenishment ID, the management server 10 specifies denominations and the quantity for each denomination of cash to be dispensed from the virtual safe 202, and updates the in-store virtual safe information 80 (step S14). In addition, the management server 10 transmits, to the operation terminal 112, information of the cash to be dispensed from the virtual safe 202, and instructs update of the virtual safe information 82. Based on the information received from the management server 10, the operation terminal 112 updates the virtual safe information 82 (step S14).

The clerk moves from the second area 12 to the first area 11 while carrying cash for replenishment (step S15). The clerk, having arrived at the first area 11, performs a replenishment operation on the cash handling apparatus 101 (step S16). Specifically, the clerk operates the operation unit of the cash handling apparatus 101 to input the replenishment ID previously received at the mobile terminal 5. The clerk deposits the cash from an inlet of the cash handling apparatus 101 to replenish the apparatus with the cash (step S17). The cash handling apparatus 101 takes the cash placed in the inlet by the clerk, one by one into the apparatus, recognizes and counts the cash, and stores the cash in a storage unit inside the apparatus. Thus, the cash handling apparatus 101 in the first area 11 is replenished with the cash taken out from the second area 12.

The cash handling apparatus 101 transmits, to the management server 10, the replenishment ID inputted by the clerk. Based on the received replenishment ID, the management server 10 specifies denominations and the quantity for each denomination of cash with which the cash handling apparatus 101 is to be replenished, and updates the in-store apparatus information 70 based on the specified information (step S18). In addition, the management server 10 transmits, to the cash handling apparatus 101, the denominations and the quantity for each denomination of the cash with which the cash handling apparatus 101 is to be replenished. The cash handling apparatus 101 confirms that the denominations and the quantity for each denomination, received from the management server 10, match the recognition and counting result of the actually replenished cash, and thereafter updates the apparatus inventory information 71 (step S18).

If the information of the cash for replenishment, which has been received by the cash handling apparatus 101 from the management server 10 based on the replenishment ID, does not match the information obtained by recognizing and counting the actually replenished cash, the process in step S18 is not executed, and a process of notifying the clerk of this mismatch is executed. For example, the cash handling apparatus 101 displays, on the display unit of the cash handling apparatus 101, information indicating that the actually replenished cash is different from the information, of the cash for replenishment, received from the management server 10, and transmits this information to the management server 10. For example, upon receiving this notification, the management server 10 transmits information indicating that a problem has occurred in the replenishment process executed in the cash handling apparatus 101 in the first area 11, to the mobile terminal 5 of a manager who manages the clerk in charge of the replenishment process. The manager and the clerk in charge of the replenishment process can take an appropriate countermeasure through an investigation for the cause of the difference between the information of the cash for replenishment managed by the management server 10 and the cash actually supplied to the cash handling apparatus 101. For example, correction of the information and retransfer of the cash will be performed.

As for the dispensing process in the first pattern, the virtual safe information 82 is updated in step S14 immediately after the dispensing operation of taking out the cash for replenishment from the virtual safe 202 in step S13. However, the update timing can be changed by settings. For example, it can be set that the operation terminal 112 updates the virtual safe information 82, based on the recognition and counting result by the cash handling apparatus 101 after it is confirmed that the information of the cash for replenishment managed by the management server 10 matches the information of the cash actually supplied to the cash handling apparatus 101.

In a case where the dispensing pattern of the virtual safe 202 is set to the second pattern (step S12: No), the clerk need not perform an operation on the operation terminal 112 of the second area 12 when dispensing cash from the virtual safe 202, i.e., when taking out the cash, which is manually managed in the second area 12, from the virtual safe 202 of the second area 12. The clerk moves to the first area 11 while carrying the cash for replenishment taken out from the second area 12 (step S19). The clerk, having arrived at the first area 11, performs a replenishment operation on the cash handling apparatus 101. Specifically, the clerk inputs, in the cash handling apparatus 101, the replenishment ID previously received at the mobile terminal 5 (step S20). The clerk deposits, from the inlet of the cash handling apparatus 101, the cash for replenishment brought from the second area 12, thereby replenishing the apparatus with the cash (step S21). The cash handling apparatus 101 takes the cash placed in the inlet by the clerk, one by one into the apparatus, recognizes and counts the cash, and stores the cash in a storage unit inside the apparatus. Thus, the cash handling apparatus 101 in the first area 11 is replenished with the cash brought from the second area 12.

The cash handling apparatus 101 transmits, to the management server 10, the replenishment ID inputted by the clerk. Based on the received replenishment ID, the management server 10 specifies denominations and the quantity for each denomination of cash with which the cash handling apparatus 101 is to be replenished, and updates the in-store apparatus information 70 based on the specified information (step S22).

In addition, the management server 10 transmits, to the cash handling apparatus 101, the denominations and the quantity for each denomination of the cash with which the cash handling apparatus 101 is to be replenished. The cash handling apparatus 101 confirms that the denominations and the quantity for each denomination, received from the management server 10, match the recognition and counting result of the actually replenished cash, and thereafter updates the apparatus inventory information 71 (step S22).

The management server 10 also transmits the denominations and the quantity for each denomination of the cash with which the cash handling apparatus 101 is to be replenished, to the operation terminal 112 that manages the virtual safe information 82 in the second area 12 from which the cash for replenishment was obtained. The operation terminal 112 updates the virtual safe information 82, based on the information received from the management server 10 (step S23).

If the information of the cash for replenishment, which has been received by the cash handling apparatus 101 from the management server 10, does not match the information of the actually supplied cash, the process in step S22 is not performed, and a notification process for the clerk and the manager is executed, followed by investigation for the cause, as described above.

As for the process of determining that the information of the cash for replenishment managed by the management server 10 matches the information of the cash actually supplied to the cash handling apparatus 101, this process may not necessarily be executed by the cash handling apparatus 101. For example, the management server 10 may receive the recognition and counting result of the cash for replenishment from the cash handling apparatus 101, and perform the determination process.

Figure 7A:
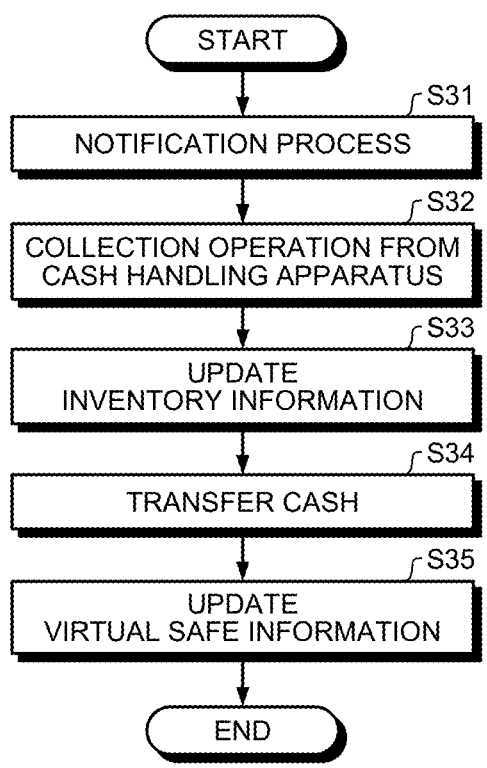
FIGS. 7A and 7B are flowcharts illustrating a cash collection process executed between areas.
Figure 7B:
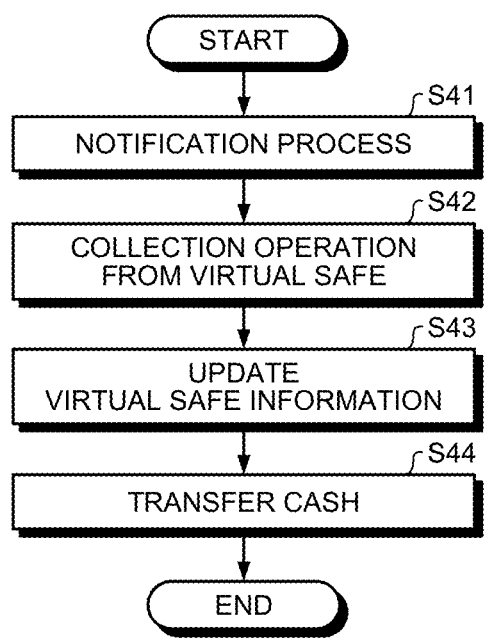

Next, a cash collection process executed between areas in the store 1 is described. FIGS. 7A and 7B are flowcharts each illustrating a cash collection process executed between areas. FIG. 7A is a flowchart illustrating a collection process of collecting cash from a cash handling apparatus to a virtual safe present in another area. FIG. 7B is a flowchart illustrating a collection process of collecting cash from a virtual safe to a virtual safe present in another area.

For example, when cash is collected from a cash handling apparatus into a virtual safe that manages proceeds from sales in the store 1 after closing time of the store 1, a cash collection process is executed between different areas. When the closing time of the store 1 has come, the management server 10 determines that collection of cash from a cash handling apparatus into a virtual safe present in another area is required. The management server 10, based on a predetermined setting prepared previously, specifies denominations and the quantity for each denomination of cash to be collected, and starts the process shown in FIG. 7A. For example, in a case where setting is made to collect all the cash from the cash handling apparatus, the management server 10 specifies denominations and the quantity for each denomination of the cash to be collected from the cash handling apparatus, based on the in-store apparatus information 70. For another example, in a case where setting is made to leave some cash as change for the next day in the cash handling apparatus, the management server 10 specifies denominations and the quantity for each denomination of the cash to be collected from the cash handling apparatus, based on the in-store apparatus information 70 and on denominations and the quantity for each denomination of the cash to be left as the change. Hereinafter, the description will be continued for a case where cash is collected from the cash handling apparatus 101 in the first area 11 into the virtual safe 202 in the second area 12.

For example, the management server 10 executes a notification process to transmit, to the mobile terminal 5 of the clerk, information instructing collection of cash (step S31). The information transmitted to the mobile terminal 5 includes: a collection ID (collection identification information) for identifying each collection process; denominations and the quantity for each denomination of cash to be collected; information indicating the cash handling apparatus 101 as a collection source and the first area 11 where the cash handling apparatus 101 is installed; and information indicating the virtual safe 202 as a collection destination and the second area 12 where the virtual safe 202 is present. Even when a plurality of collection processes are executed in parallel in the store 1, collection IDs thereof allow the management server 10 to manage the respective collection processes to be distinguished from each other.

The clerk, having checked the information on the mobile terminal 5, goes to the first area 11 and performs a collection operation in the cash handling apparatus 101 (step S32). Specifically, the clerk operates the operation unit of the cash handling apparatus 101 to input the collection ID previously received at the mobile terminal 5. The cash handling apparatus 101 transmits the inputted collection ID to the management server 10.

Based on the received collection ID, the management server 10 specifies denominations and the quantity for each denomination of cash to be collected from the cash handling apparatus 101, and updates the in-store apparatus information 70 based on the specified information (step S33). In addition, the management server 10 transmits, to the cash handling apparatus 101, information of the denominations and the quantity for each denomination of the cash to be collected from the cash handling apparatus 101. Based on the information received from the management server 10, the cash handling apparatus 101 updates the apparatus inventory information 71 (step S33). In addition, the cash handling apparatus 101 dispenses the cash to be collected, based on the information received from the management server 10.

The clerk collects the cash dispensed from the cash handling apparatus 101, moves from the first area 11 to the second area 12, and deposits the collected cash in the virtual safe 202 of the second area 12 (step S34). That is, the clerk starts manual management, in the second area 12, for the cash collected from the cash handling apparatus 101. For example, the collected cash is stored in a metallic safe box installed in the second area 12, and thereafter is transported to a financial facility by the cash-in-transit company 90.

Based on the denominations and information for each denomination, of the cash to be collected, which are specified based on the collection ID, the management server 10 updates the cash information, in the second area 12, which is managed in the in-store virtual safe information 80 (step S35). The management server 10 transmits information of the denominations and the quantity for each denomination of the cash to be collected, to the operation terminal 112 for managing the virtual safe 202 of the second area 12 as the collection destination. Based on the information received from the management server 10, the operation terminal 112 updates the virtual safe information 82 (step S35).

At the closing time of the store 1, all the cash managed in the respective virtual safes in the store 1 may be collected into one virtual safe. For example, in a case where it is prescribed in the store 1 that, after the closing time, cash is collected from the virtual safes in other areas and stored in the metallic safe box in the second area 12, a collection process is performed between the virtual safes in the different areas.

When the closing time of the store 1 has come, the management server 10 determines that collection of cash from the virtual safes in the respective areas into the virtual safe 202 in the second area 12 is required, and starts the process shown in FIG. 7B. Hereinafter, the description will be continued for the case where cash is collected from the virtual safe 201 in the first area 11 and transferred to the virtual safe 202 in the second area 12.

The management server 10 executes a notification process to transmit, to the mobile terminal 5 of the clerk, information instructing collection of cash (step S41). The information transmitted to the mobile terminal 5 includes: a collection ID (collection identification information) for identifying each collection process; denominations and the quantity for each denomination of cash to be collected; information indicating the virtual safe 201 as a collection source and the first area 11 where the virtual safe 201 is present; and information indicating the virtual safe 202 as a collection destination and the second area 12 where the virtual safe 202 is present.

The clerk, having checked the information on the mobile terminal 5, goes to the first area 11 and performs a collection operation of collecting cash from the virtual safe 201 (step S42). Specifically, the clerk operates the operation unit of the cash handling apparatus 101 to input the collection ID previously received at the mobile terminal 5. The cash handling apparatus 101 transmits the inputted collection ID to the management server 10.

Based on the received collection ID, the management server 10 specifies denominations and the quantity for each denomination of cash to be collected from the virtual safe 201, and updates the in-store virtual safe information 80 based on the specified information (step S43). The management server 10 transmits information of the denominations and the quantity for each denomination of the cash to be collected from the virtual safe 201, to the cash handling apparatus 101 for managing the virtual safe information 81 in the first area 11 as a collection source. Based on the information received from the management server 10, the cash handling apparatus 101 updates the virtual safe information 81 (step S43).

The management server 10 also transmits the information of the denominations and the quantity for each denomination of the cash to be collected, specified based on the collection ID, to the operation terminal 112 for managing the virtual safe information 82 in the second area 12 as a collection destination. Based on the information received from the management server 10, the operation terminal 112 updates the virtual safe information 82 (step S43).

The clerk moves to the second area 12 while carrying the cash collected from the virtual safe 201 of the first area 11, and starts manual management for the collected cash in the virtual safe 202 of the second area 12. For example, the collected cash is stored in the metallic safe box installed in the second area 12, and thereafter is transported to a financial facility by the cash-in-transit company 90.

In the present embodiment, cash to be handled is specified by denominations and the quantity for each denomination. However, other information may be used as long as the cash can be specified. For example, cash may be specified according to denominations and the monetary amount for each denomination. Alternatively, for example, if only the monetary amount of cash is considered irrespective of denominations, cash may be specified by only the monetary amount without specifying denominations.

Although not described in the present embodiment, authentication of a clerk may be performed before the clerk operates the cash handling apparatus 101 and the operation terminal 112, and only an authenticated clerk is allowed to use the cash handling apparatuses 101, 102. The cash handling apparatus 101 and the operation terminal 112 each may execute authentication while requesting the clerk to input a user ID (identification information) assigned to the clerk and a password. Alternatively, for example, the cash handling apparatus 101 and the operation terminal 112 each may read, with a dedicated reader, identification information stored in an IC card that is given to each clerk, thereby executing authentication of the clerk. The authentication enables strict management of cash in the cash handling apparatuses 101, 102.

In the present embodiment, the operation units of the cash handling apparatus 101 and the operation terminal 112 are operated to input various information. However, the information inputting method is not limited thereto. For example, when executing a collection process, a cash handling apparatus serving as a cash transfer source or an operation terminal connected to a cash handling apparatus as a cash transfer source may print, with a printer, a graphic code generated by encoding a collection ID, and a cash handling apparatus serving as a cash transfer destination or an operation terminal connected to a cash handling apparatus as a cash transfer destination may read, with a reader, the graphic code to decode the collection ID. Likewise, when executing a replenishment process, printing and reading of a graphic code generated by encoding a replenishment ID may be performed so that the replenishment ID is exchanged between apparatuses. For example, when input/output of information between apparatuses is performed by use of barcodes generated by encoding a collection ID and a replenishment ID, the clerk can easily progress each work. The graphic code may not necessarily be printed, and may be transmitted to the mobile terminal 5 of the clerk. Then, the clerk may cause a reader connected to the cash handling apparatus and/or the operation terminal connected to the cash handling apparatus to read the graphic code displayed on the screen of the mobile terminal 5, thereby inputting the collection ID and the replenishment ID.

In the present embodiment, for ease of description, when cash for replenishment cannot be obtained from one cash handling apparatus and when cash for replenishment cannot be obtained from one virtual safe, it is determined that cash for replenishment cannot be obtained. However, the determination method is not limited thereto. The management server 10 may obtain cash for replenishment from a plurality of cash handling apparatuses or a plurality of virtual safes. Alternatively, the management server 10 may obtain cash for replenishment from one or more cash handling apparatuses and one or more virtual safes. In this case, based on the in-store apparatus information 70 and the in-store virtual safe information 80, the management server 10 determines a breakdown of cash to be obtained from the cash handling apparatuses and cash to be obtained from the virtual safes so as to obtain the cash for replenishment from a fewer number of cash handling apparatuses and virtual safes. Likewise, in a collection process, the management server 10 may distribute and transfer cash collected from a cash handling apparatus or a virtual safe to a plurality of virtual safes. For example, it is assumed that a cash transfer distance is set to be shortest, an upper-limit amount is set for cash to be manually managed in an area and therefore, the upper-limit amount will be exceeded when all the collected cash is transferred to one virtual safe at the shortest distance. In this case, the management server 10 may determine a plurality of transfer destinations so as to transfer cash exceeding the upper-limit amount of the one virtual safe to another virtual safe. In these cases, the management server 10 may notify the clerk of information of the cash to be transferred and information to identify one or more sources and one or more destinations of the cash, whereby the clerk can transfer the cash based on the notified information, as described above.

Likewise, when the clerk determines a virtual safe to be a cash replenishment source, the clerk can select a plurality of virtual safes as replenishment sources. For example, in a case where the clerk selects one virtual safe as a replenishment source but only a part of the cash for replenishment can be obtained from the selected virtual safe due to an error in the in-store virtual safe information 80, the clerk moves to another area and obtains cash corresponding to the shortage from the another virtual safe. In this case, the clerk operates the mobile terminal 5 to transmit, to the management server 10, information indicating a plurality of virtual safes from which the cash for replenishment is obtained and information indicating a breakdown of the cash obtained from each virtual safes. Based on the information received from the mobile terminal 5, the management server 10 updates the in-store virtual safe information 80, and the input devices, which manage the respective virtual safes selected as replenishment sources, update the virtual safe information, whereby the processes can be progressed as described above.

The configuration of the cash management system shown in FIG. 1 of the present embodiment is conceptually functional, and thus the cash management system is not physically limited to the configuration. That is, distributed or integrated forms of each device are not limited to the forms described above, and all or some of the forms may be distributed or integrated functionally or physically in any unit depending on various loads, use statuses, or the like.

In the present embodiment, a cash management apparatus includes: a communication unit configured to acquire information of cash stored in a cash handling apparatus and information of cash kept outside the cash handling apparatus wherein the cash handling apparatus is configured to recognize and count cash and store the cash therein; a memory configured to store therein the information of the cash stored in the cash handling apparatus, and store therein the information of the cash kept outside the cash handling apparatus as information of cash kept in a virtual safe; and a control unit configured to output the information of the cash kept in the virtual safe, which is stored in the memory, to notify a user. A plurality of pieces of information, each of which is information of cash kept in each of a plurality of virtual safes, is stored in the memory.

In the above configuration, the cash management apparatus further includes a display unit configured to display information. The control unit is configured to output the information of the cash kept in the virtual safe, to the display unit and to an external device.

In the above configuration, the cash kept in the virtual safe is any one of: cash kept in a predetermined place; cash kept in an apparatus other than the cash handling apparatus; and cash kept in a container.

In the above configuration, the control unit is configured to output the information of the cash stored in the cash handling apparatus, in addition to the information of the cash kept in the virtual safe.

In the above configuration, the control unit is configured to output the information of the cash kept in the virtual safe and the information of the cash stored in the cash handling apparatus so as to be distinguishable from each other.

In the above configuration, the control unit is configured to output denominations and a quantity for each denomination of the cash stored in the cash handling apparatus, and denominations and a quantity for each denomination of the cash kept in the virtual safe.

In the above configuration, the control unit is configured to output the information of the cash kept in the virtual safe including a first information of cash counted by the cash handling apparatus and a second information of cash other than the counted cash. The first information and the second information are outputted such that the first information is distinguishable from the second information.

In the above configuration, the communication unit is configured to acquire the information of the cash kept outside the cash handling apparatus, from the cash handling apparatus to which the information of the cash kept outside the cash handing apparatus is inputted.

In the above configuration, the communication unit is configured to acquire the information of the cash kept outside the cash handling apparatus, from an input device to which the information of the cash kept outside the cash handling apparatus is inputted.

In the above configuration, the memory is configured to store therein information of cash stored in a cash handling apparatus installed in each of a plurality of areas, and information of cash kept in a virtual safe of each area. The control unit is configured to output the information of the cash in each area.

In the above configuration, when transfer of cash is performed between the areas, the control unit is configured to update information of cash decreased in an area being a transfer source and information of cash increased in an area being a transfer destination, based on at least one of information, of the cash, acquired in the transfer source area, and information, of the cash, acquired in the transfer destination area.

In the above configuration, when transfer of cash is performed between the areas, and the cash is recognized and counted by a cash handling apparatus for the transfer, the control unit is configured to update, based on a result of recognition and counting of the transferred cash, information of cash decreased in the transfer source area and information of cash increased in the transfer destination area.

In the above configuration, when transfer of cash is performed between the areas, the control unit is configured to assign identification information to the transfer to manage a plurality of transfers, and update, based on the identification information, information of cash decreased in the transfer source area and information of cash increased in the transfer destination area.

In the above configuration, when a cash handling apparatus is required to be replenished with cash, the control unit is configured to specify, based on the information of the cash kept in the virtual safe in each area, an area having a virtual safe from which the cash for replenishment can be obtained, and notify the user of a specified area.

In the above configuration, when the cash for replenishing the cash handling apparatus cannot be obtained from the cash kept in the virtual safe, the control unit is configured to specify, based on the information of the cash stored in the cash handling apparatus in each area, an area having a cash handling apparatus from which the cash for replenishment can be obtained, and notify the user of a specified area.

In the above configuration, when the cash for replenishment cannot be obtained from the cash kept in the virtual safe and the cash stored in the cash handling apparatus, the control unit is configured to execute a process for requesting transport of the cash from outside the areas.

In the above configuration, the control unit is configured to notify a person in charge of transfer of cash between the areas of: information indicating a denomination and a quantity of cash for replenishment; information indicating an area of a replenishment source from which the cash is obtained; information indicating the cash handling apparatus to be replenished with the cash; and information indicating an area of a replenishment destination where the cash handling apparatus is installed.

In the present embodiment, a cash management system includes the management apparatus in the above configuration, and at least one cash handling apparatus.

In the present embodiment, a cash management method to be executed by a cash management apparatus for managing cash stored in a cash handling apparatus and cash kept outside the cash handling apparatus, the cash handling apparatus being configured to recognize and count cash and store the cash therein. The method includes: acquiring information of the cash stored in the cash handling apparatus; storing, in a memory, the information of the cash stored in the cash handling apparatus; acquiring information of the cash kept outside the cash handling apparatus; storing, in the memory, the information of the cash kept outside the cash handling apparatus as information of cash kept in a virtual safe; and outputting the information of the cash kept in the virtual safe, which is stored in the memory, to notify a user. A plurality of pieces of information, each of which is information of cash kept in each of a plurality of virtual safes, is stored in the memory.

The cash management apparatus can manage cash stored in a cash handling apparatus, and can manage cash, which is kept outside the cash handling apparatus without being stored in the apparatus, as cash kept in a virtual safe. The cash management apparatus manages cash, which is kept outside a cash handling apparatus in each of two or more areas, as cash kept in different virtual safes, thereby managing information of cash for each area.

As described above, according to the cash management system, the management server 10 can set virtual safes corresponding to a plurality of areas in one store, respectively, and can manage denominations and the quantity for each denomination of cash being manually managed in each area, as information of cash being stored in each virtual safe. In addition, the management server 10 can manage the inventory quantity of cash being stored in each of one or more cash handling apparatuses installed in each area. Therefore, for example, when shortage of cash occurs in a cash handling apparatus in a certain area, this cash handling apparatus can be replenished with cash obtained from a cash handling apparatus and/or a virtual safe in the same area and/or different area. All the cash present in the plurality of areas in the store can be managed in the cash management system and it enables that shortage of cash in one area in the store can be resolved by using cash in another area in the same store. Thus, the number of times of requesting a cash-in-transit company to transport cash to the store and waiting for arrival of the cash, can be reduced. In addition, the cost for cash transport can be reduced.

The following description relates to a computer environment in which embodiments of the present disclosure may be implemented. This environment may include an embedded computer environment, local multi-processor embodiment, remote (e.g., cloud-based) environment, or a mixture of all the environments.

FIG. 8 illustrates a block diagram of a computer that may implement the various embodiments described herein. The present disclosure may be embodied as a system, a method, and/or a computer program product. The computer program product may include a computer readable storage medium on which computer readable program instructions are recorded that may cause one or more processors to carry out aspects of the embodiment. For example, the management server 10, external server 2, mobile terminal 5, cash handling apparatus 101 and cash handling apparatus 102 may be configured to include various elements depicted in FIG. 8.

The non-transitory computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 8 is a functional block diagram illustrating a networked system 800 of one or more networked computers and servers. In an embodiment, the hardware and software environment illustrated in FIG. 8 may provide an exemplary platform for implementation of the software and/or methods according to the present disclosure.

Referring to FIG. 8, a networked system 800 may include, but is not limited to, computer 805, network 810, remote computer 815, web server 820, cloud storage server 825 and compute server 830. In some embodiments, multiple instances of one or more of the functional blocks illustrated in FIG. 8 may be employed.

Additional detail of computer 805 is shown in FIG. 8. The functional blocks illustrated within computer 805 are provided only to establish exemplary functionality and are not intended to be exhaustive. And while details are not provided for remote computer 815, web server 820, cloud storage server 825 and compute server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and compute server 830.

What is claimed is:

1. A cash management apparatus comprising:
   a communication interface configured to acquire information of cash stored in a cash handling apparatus and information of cash kept outside the cash handling apparatus, wherein the cash handling apparatus is configured to recognize, count and store cash;
   a memory configured to store the information of the cash stored in the cash handling apparatus, and store the information of the cash kept outside the cash handling apparatus as information of cash kept in a virtual safe; and
   processing circuitry configured to output the information of the cash kept in the virtual safe, which is stored in the memory, to notify a user, wherein
   the memory is configured to store the information of cash stored in a cash handling apparatus installed in each of a plurality of areas, and the information of cash kept in a virtual safe of each area, and
   the processing circuitry is configured to output the information of the cash in each area.

2. The cash management apparatus of claim 1, further comprising:
   a display configured to display information, wherein
   the processing circuitry is configured to output the information of the cash kept in the virtual safe to the display and to an external device.

3. The cash management apparatus of claim 1, wherein the cash kept in the virtual safe is any one of:
   cash kept in a predetermined place;
   cash kept in an apparatus other than the cash handling apparatus; and
   cash kept in a container.

4. The cash management apparatus of claim 1; wherein the processing circuitry is configured to output the information of the cash stored in the cash handling apparatus, in addition to the information of the cash kept in the virtual safe.

5. The cash management apparatus of claim 4, wherein the processing circuitry is configured to output the information of the cash kept in the virtual safe and the information of the cash stored in the cash handling apparatus so as to be distinguishable from each other.

6. The cash management apparatus of claim 1, wherein the processing circuitry is configured to output denominations and a quantity for each denomination of the cash stored in the cash handling apparatus, and denominations and a quantity for each denomination of the cash kept in the virtual safe.

7. The cash management apparatus of claim 1, wherein the processing circuitry is configured to output the information of the cash kept in the virtual safe including a first information of cash counted by the cash handling apparatus and a second information of cash other than the counted cash such that the first information is distinguishable from the second information.

8. The cash management apparatus of claim 1, wherein the communication interface is configured to acquire the information of the cash kept outside the cash handling apparatus, from the cash handling apparatus to which the information of the cash kept outside the cash handling apparatus is inputted.

9. The cash management apparatus of claim 1, wherein the communication interface is configured to acquire the information of the cash kept outside the cash handling apparatus, from an input device to which the information of the cash kept outside the cash handling apparatus is inputted.

10. The cash management apparatus of claim 1, wherein when transfer of cash is performed between the areas, the processing circuitry is configured to update information of cash decreased in an area being a transfer source and information of cash increased in an area being a transfer destination, based on at least one of information, of the cash, acquired in the transfer source area, and information, of the cash, acquired in the transfer destination area.

11. The cash management apparatus of claim 1, wherein when transfer of cash is performed between the areas, and the cash is recognized and counted by a cash handling apparatus for the transfer, the processing circuitry is configured to update, based on a result of recognition and counting of the transferred cash, information of cash decreased in a transfer source area and information of cash increased in a transfer destination area.

12. The cash management apparatus of claim 1, wherein when transfer of cash is performed between the areas, the processing circuitry is configured to assign identification information to the transfer to manage a plurality of transfers, and update, based on the identification information, information of cash decreased in a transfer source area and information of cash increased in a transfer destination area.

13. The cash management apparatus of claim 1, wherein when a cash handling apparatus is required to be replenished with cash, the processing circuitry is configured to specify, based on the information of the cash kept in the virtual safe in each area, an area having a virtual safe from which the cash for replenishment can be obtained, and notify the user of a specified area.

14. The cash management apparatus of claim 13 wherein when the cash for replenishing the cash handling apparatus cannot be obtained from the virtual safe, the processing circuitry is configured to specify, based on the information of the cash stored in the cash handling apparatus in each area, an area having a cash handling apparatus from which the cash for replenishment can be obtained, and notify the user of a specified area.

15. The cash management apparatus of claim 14, wherein when the cash for replenishment cannot be obtained from the cash kept in the virtual safe and the cash stored in the cash handling apparatus, the processing circuitry is configured to execute a process for requesting transport of the cash from outside the areas.

16. The cash management apparatus of claim 13, wherein the processing circuitry is configured to notify a person in charge of transfer of cash between the areas of:

information indicating a denomination and a quantity of cash for replenishment;
information indicating an area of a replenishment source from which the cash is obtained;
information indicating the cash handling apparatus to be replenished with the cash; and
information indicating an area of a replenishment destination where the cash handling apparatus is installed.

17. A cash management system comprising:
at least one cash handling apparatus; and
a cash management apparatus including
 a communication interface configured to acquire information of cash stored in a cash handling apparatus and information of cash kept outside the cash handling apparatus, wherein the cash handling apparatus is configured to recognize, count and store cash;
 a memory configured to store: the information of the cash stored in the cash handling apparatus, and store the information of the cash kept outside the cash handling apparatus as information of cash kept in a virtual safe; and
 processing circuitry configured to output the information of the cash kept in the virtual safe, which is stored in the memory, to notify a user, wherein
 the memory is configured to store the information of cash stored in a cash handling apparatus installed in each of a plurality of areas, and the information of cash kept in a virtual safe of each area, and
 the processing circuitry is configured to output the information of the cash in each area.

18. A cash management method to be executed by a cash management apparatus for managing cash stored in a cash handling apparatus and cash kept outside the cash handling apparatus, the cash handling apparatus being configured to recognize, count and store cash, the method comprising:
acquiring information of the cash stored in the cash handling apparatus;
storing, in a memory; the information of the cash stored in the cash handling apparatus;
acquiring information of the cash kept outside the cash handling apparatus;
storing, in the memory, the information of the cash kept outside the cash handling apparatus as information of cash kept in a virtual safe; and
outputting the information of the cash kept in the virtual safe, which is stored in the memory, to notify a user,
wherein the information of cash stored in a cash handling apparatus installed in each of a plurality of areas, and the information of cash kept in a virtual safe of each area, is stored in the memory; and
the method includes outputting the information of the cash in each area.

\* \* \* \* \*